W. CRAINE.
CHAIN TIGHTENER.
APPLICATION FILED DEC. 11, 1913.
1,112,680.
Patented Oct. 6, 1914.
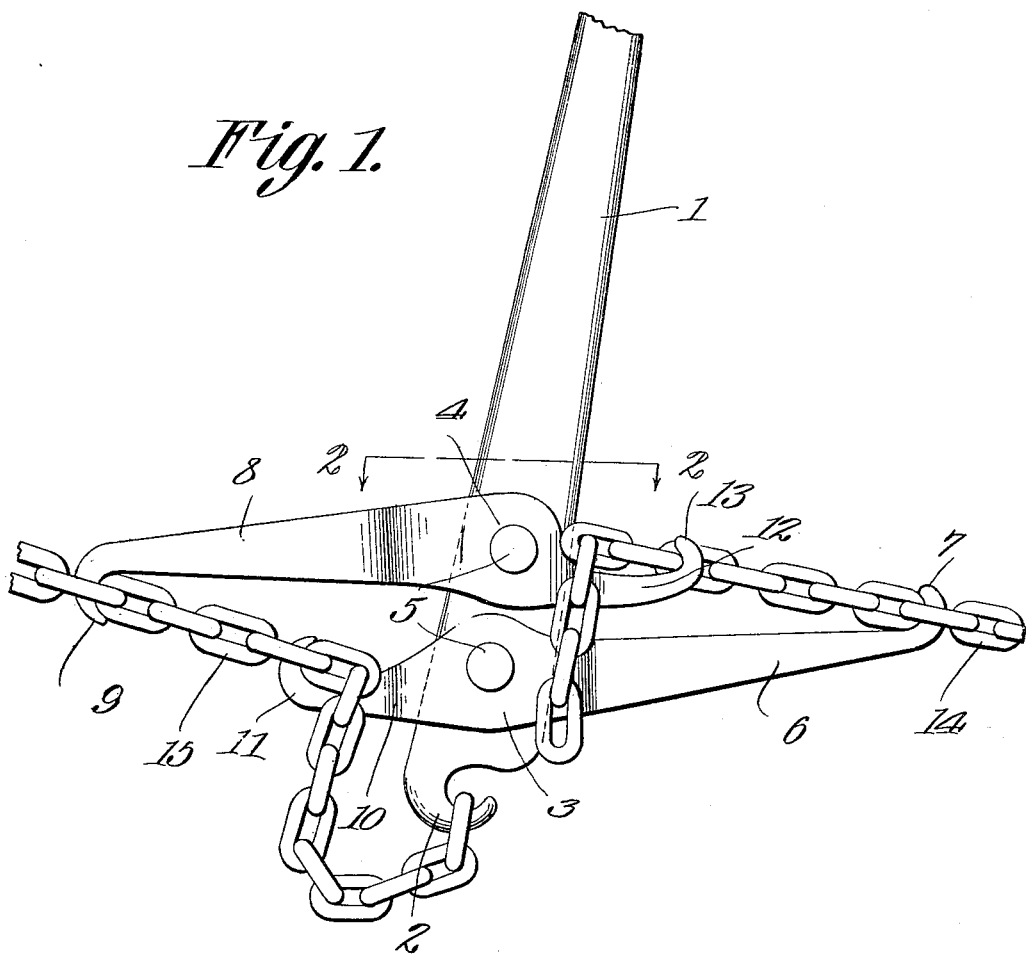
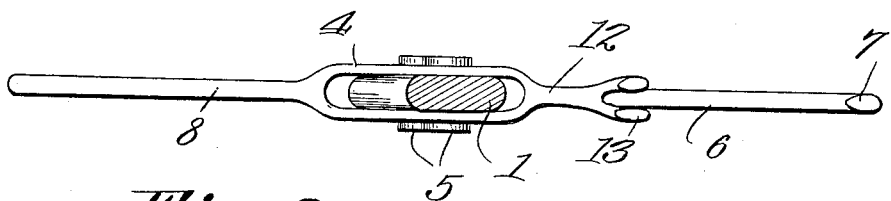
Witnesses
William Craine
Inventor,
by C. A. Snow & Co.
Attorneys.

UNITED STATES PATENT OFFICE.

WILLIAM CRAINE, OF BROOKFIELD, NEW YORK.

CHAIN-TIGHTENER.

1,112,680.  Specification of Letters Patent.  Patented Oct. 6, 1914.

Application filed December 11, 1913. Serial No. 806,014.

*To all whom it may concern:*

Be it known that I, WILLIAM CRAINE, a citizen of the United States, residing at Brookfield, in the county of Madison and State of New York, have invented a new and useful Chain-Tightener, of which the following is a specification.

The present invention appertains to a chain tightener or stretcher, which may be employed for stretching or tightening fences or the wire strands thereof, and for divers other purposes as will be apparent to the user.

It is the object of the present invention to provide a novel and improved device of the nature indicated, which shall be simple, durable, substantial and inexpensive in construction, the device embodying but few parts and being devoid of any intricate or complex parts which would be liable to get out of order.

A further object of the present invention is to provide a tightening or stretching mechanism embodying a unique assemblage and construction of component parts, whereby the device will be simple, convenient, practical and efficient in its use.

With the foregoing and other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the improved tightening or stretching mechanism, illustrating a pair of draft chains applied thereto, a portion of the handle or lever being broken away. Fig. 2 is a sectional view taken on the line 2—2 of Fig. 1.

The present device embodies a hand lever or handle 1 preferably formed from a bar of metal, and fashioned with a hook 2 at one end between its edges. Adjoining the said end of the lever or handle 1, are disposed a pair of members 3 and 4, which are pivoted or fulcrumed to the lever 1, by means of the rivets or pins 5, the members 3 and 4 being preferably provided with openings through which the lever passes. The member 3 is provided with a rigid hook at one side, embodying the shank 6 projecting from the member 3, and the terminal bill 7, while the member 4 is provided with a similar hook embodying the shank 8 projecting toward the other side, and terminating in the bill 9. The aforesaid hooks are relatively long and project in opposite directions. The members 3 and 4 are provided with relatively short hooks projecting in directions opposite to the respective aforesaid hooks. Thus, the member 3 is provided with a relatively short shank 10 projecting in a direction opposite to the shank 6 and terminating in a bill 11. Similarly, the member 4 is provided with a relatively short shank 12 projecting in a direction opposite to that of the shank 8 and terminating in a bifurcated or forked bill 13. The complemental members 3 and 4 are thus each provided with a rigid hook at each side of the lever, the long and short hooks of the two members being reversed. Attention is directed to the fact that the bills 7 and 13 at one side project in the same direction, while the bills 9 and 11 at the other side project toward each other or in opposite directions. The bill 13 projects away from the shank 6, while the bill 7 projects in a direction similar to the bill 13. The bill 11 of the short hook of the member 3, projects toward the shank 8 of the complementary long hook of the member 4, while the bill 9 of the said long hook projects in a direction opposite to the direction of the bill 11.

In use, the present device is adapted to be employed in connection with a pair of chains 14 and 15, which may be connected to any suitable objects to be stretched or drawn together. Thus, one of the chains may be anchored to a post, while the other is attached to a fence or wire strand, to be stretched. It is obvious that the device may be employed in various capacities for creating a draft or strain. To pull the chains 14 and 15 together, the long hooks have their bills 7 and 9 engaged to certain links of the chains 14 and 15 and the lever is swung in the proper direction, to draw the chains slightly toward each other, in which event, the proper links of the chains are engaged with the bills 11 and 13 of the short hooks and the lever is then swung in opposite direction, which will result in a further movement of the chains toward each other. By continuing this operation, the chains may be drawn together to the desired extent, the engagement of the hooks with the links being readily accomplished, and being partially automatic due to the positioning of the bills of the hooks. The lever 1 is preferably disposed in an upwardly projecting position, whereby the bills 7 and 13 at one side, engage upwardly through the chain 14, and whereby the bill 9 at the other side will engage downwardly through the links of the chain 15, while bill 11 engages upwardly through the links of the latter chain. It will thus be evident, that when the long hooks are engaged to the chains to draw them together, the slack portions of the chains may be readily engaged over the short hooks, after the lever has been swung to draw the chains together by their engagement with the short hooks, the long hooks will readily engage the proper links of the chains. The bifurcated or forked bill 13 is not only adapted to have its tines or branches engaged through the links of the chain 14, but is also adapted to engage over the respective links of the said chain, so as to receive and hold the companion links, as clearly indicated in Fig. 1. In this manner, should it be impossible to swing the lever 1 for a full stroke, the hook 13 may be engaged to the successive links of the chain 14, whereby the chains 14 and 15 may be drawn together, for a distance of one half a link, under such conditions, when the lever 1 cannot be completely oscillated or swung. The slack portion or free end of the chain 15 may be engaged to the hook 2 of the lever to be held thereby. This enables the chain 14 to be employed as an anchor chain, while the chain 15 is attached to the object to be drawn or stretched.

From the foregoing, the advantages and capabilities of the present device will be obvious to those familiar in the art, and need not be described further.

Having thus described the invention, what is claimed as new is:—

1. A device of the character described embodying a lever, and a pair of complemental members pivoted thereto and each having a pair of rigid hooks projecting in opposite directions from the lever, the hooks at one side projecting in the same direction, and the hooks at the other side projecting toward each other.

2. A device of the character described embodying a lever, a pair of complemental members pivoted thereto and each having a rigid short hook projecting to one side and a rigid long hook projecting toward the other side, the short and long hooks of one member projecting in directions similar to the long and short hooks, respectively, of the other member.

3. A device of the character described embodying a lever, a pair of complemental members pivoted thereto and each having a short hook projecting to one side and a long hook projecting toward the other side, the short and long hooks of the two members being reversed, the bills of the short hooks projecting away from and toward the shanks of the complemental long hooks, respectively, and the bills of the respective long hooks projecting in similar and opposite directions with respect to the bills of the short hooks.

In testimony that I claim the foregoing as my own, I have hereto affixed my signature in the presence of two witnesses.

WILLIAM CRAINE.

Witnesses:
CLARENCE V. BEEBE,
JOHN L. STILLMAN.

Copies of this patent may be obtained for five cents each, by addressing the "Commissioner of Patents, Washington, D. C."